R. G. ANDERSEN & A. B. C. HANSEN.
DEVICE IN MOTOR PLOWS.
APPLICATION FILED NOV. 22, 1916.

1,281,749.

Patented Oct. 15, 1918.

Inventors
Rudolph Gustav Andersen
Albert Bernhard Christian Hansen
By Wm Wallace White
Attorney

UNITED STATES PATENT OFFICE.

RUDOLPH GUSTAV ANDERSEN AND ALBERT BERNHARD CHRISTIAN HANSEN, OF COPENHAGEN, DENMARK.

DEVICE IN MOTOR-PLOWS.

1,281,749.

Specification of Letters Patent.   Patented Oct. 15, 1918.

Application filed November 22, 1916.   Serial No. 132,741.

*To all whom it may concern:*

Be it known that we, RUDOLPH GUSTAV ANDERSEN, engineer, and ALBERT BERNHARD CHRISTIAN HANSEN, engineer, subjects of the King of Denmark, residing at Copenhagen, in the Kingdom of Denmark, have invented new and useful Improvements in Devices in Motor-Plows, of which the following is a specification.

The present invention refers to a device in motor plows. The characteristic feature of the invention is that each plow is connected by means of a joint to an arm revoluble around a shaft. The joints are fork-shaped and of such a width that they, in combination with the arms, serve as guides for the plows, and prevent them from turning. On the naves of the arms there are tappets corresponding to tappets on the sockets which are keyed onto the shafts. The stationary tappets on the shafts are, while the motor plow is working, adjusted to such a position that they do not obstruct the free, upward movement of the plow from the greatest desired plowing-depth. The shafts can be turned simultaneously, so that the plows can be lifted simultaneously by the stationary tappets on the shafts engaging the tappets disposed on the arms, when the tappets are turned together with the shafts. The joints are secured to the plow beams in front of the vertical plane through the point of gravity of the plow, so that the front end of the plow beam is first lifted up from the ground, whereby the plow-shares are caused to assume an oblique position, with the points turned obliquely upward, so that they slide up out of the ground as on an inclined plane.

The invention is set forth in the accompanying drawing, in which—

Figure 1:
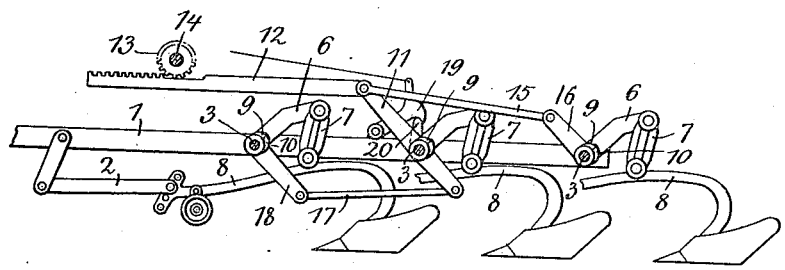
Figure 2:
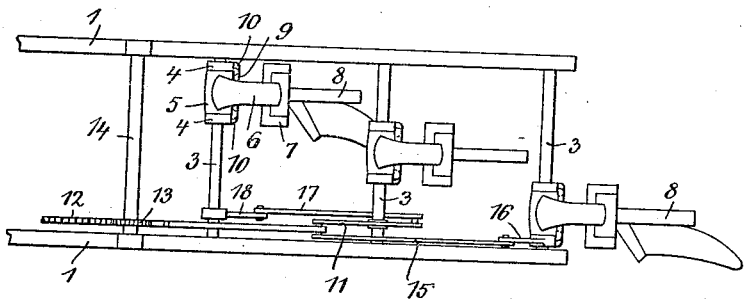
Figure 3:
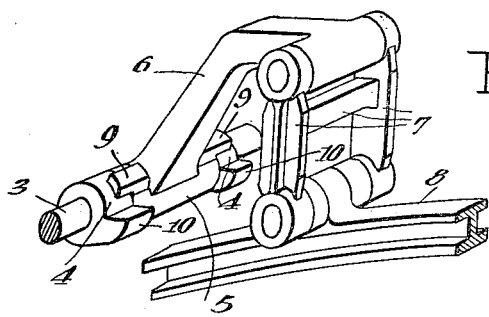

Figure 1 is a vertical, longitudinal section of a part of a motor plow, with the plow shares in the lifted position, Fig. 2 is a top view of the same, Fig. 3 is a view in perspective showing on a larger scale certain details of construction.

1 is the frame of the motor plow, to which frame the plows are secured in an ordinary, previously known manner by means of traction bars 2. 3 are shafts, which are journaled transversely in the frame 1. On the shafts 3 there are fast disposed sockets 4 (Figs. 2 and 3), on both sides of a revoluble nave 5, which carries an arm 6, the free end of which is connected with a link 7, which is revolubly connected with the plow beam 8. The nave 5 carries tappets 9 corresponding to tappets 10 on the sockets 4. The link 7 is fork-shaped and comparatively broad, whereby it helps the arm 6 to receive the strains of the plow which tend to force it sidewise.

11 is a two-armed lever fast disposed on one of the shafts 3, the upper end of which lever is connected with a cog-rack 12, which is shiftable lengthwise in the longitudinal direction of the motor plow, and which is disposed above the frame 1. 13 is a cog-wheel, or the like, which meshes in between the cogs of the cog-rack 12, and which is loosely disposed on a driving shaft 14, but can be fastly connected with it. 15 is a traction bar, which connects the cog-rack 12 with an arm 16 extending from the rear shaft 3, and 17 is a traction bar which connects the lower end of the lever 11 with an arm 18 extending from the front shaft 3.

When the plow shares are to be lifted during plowing, the cog wheel 13 is fastly connected with the shaft 14, and it then turns together with the shaft, whereby the cog-rack 12 is pulled forward until the cog wheel runs free of the last cog on the cog-rack 12. On the shifting of the latter, all the shafts are simultaneously turned by means of the lever 11, the traction bars 15 and 17, and the arms 16 and 18, whereby the tappets 10 on the sockets 4 are caused to mesh with the tappets 9 on the naves 5, so that the arms 6 oscillate around the shafts 3, and the links (and thereby also the plows) are lifted. When the links are connected with the plow beams 8 in front of the vertical plane through the point of gravity of the plow, the front end of the plow beam is first lifted up from the ground, and the plow share is thereby caused to assume an oblique position, with the point turned obliquely upward, so that it can slide up out of the ground as if on an inclined plane.

The plow shares are held in the lifted position by means of a hook 19, which meshes in over a ratchet-like arm 20 on one of the shafts 3.

When the plow share is to be lowered again, the hook 19 is lifted up from the ratchet 20, after which the plows are lowered to the ground by means of their own weight. When the tappets 9 on the naves 5 mesh with the tappets 10 on the sockets 4 fast disposed on the shafts, the shafts are turned at the same time that the plow shares are lowered, and the cog-rack 12 is thereby moved back by means of the lever 11. While the motor plow is working, the tappets 10 remain standing in the same position, and the plows can be moved, independent of one another, in a vertical direction, since the arms 6 can be turned around the shafts.

Having now particularly described and ascertained the nature of our said invention and in what manner the same is to be performed, we declare that what we claim is:—

1. In a motor plow, the combination of several plow shares, levers suspending the shares whereby the shares are adapted to be lifted simultaneously, shafts for said levers whereby each lever is revolubly mounted on its own shaft, tappets carried by each of said levers, and corresponding tappets carried by each of the shafts, said tappets being adapted to coöperate when all the plow shares are to be lifted simultaneously, but leaving each individual plow share free to move upward independently of the other ones, plow beams for the shares, and fork-shaped links pivotally connected to said levers and beams and adapted to resist the lateral thrust tending to force the shares sidewise.

2. In a motor plow, the combination of several plow shares, levers suspending the shares whereby the shares are adapted to be lifted simultaneously, shafts for said levers whereby each lever is revolubly mounted on its own shaft, tappets carried by each of said levers, and corresponding tappets carried by each of the shafts, said tappets being adapted to coöperate when all the plow shares are to be lifted simultaneously, but leaving each individual plow share free to move upward independently of the other ones, plow beams for the shares, and fork-shaped links pivotally connected to said levers and beams and adapted to resist the lateral thrust tending to force the shares sidewise, each of the said links being connected to its corresponding share at a point in front of the vertical plane through the point of gravity of the share.

3. A motor plow comprising parallel spaced bars, shafts connecting said bars, sleeves rotatably mounted on said shafts and formed with tappets, a lever fixed to each sleeve, tappets formed on said shafts and adapted to engage the tappets of said sleeves to lift the levers, a plow beam for each lever, a forked link pivotally connected to each lever and its corresponding beam, plow shares fixed to each beam at a point rearwardly of the point at which said beams are connected to said levers, arms fixed to said shafts and disposed in parallel planes, rods connecting said arms, a master arm, and means for moving said master arm lengthwise.

In testimony whereof we have signed our names to this specification in the presence of two subscribing witnesses.

RUDOLPH GUSTAV ANDERSEN.
ALBERT BERNHARD CHRISTIAN HANSEN.

Witnesses:
V. BELSCHNER,
SENGELLRARD A. MADSEN.

Copies of this patent may be obtained for five cents each, by addressing the "Commissioner of Patents, Washington, D. C."